United States Patent [19]

Kulpa

[11] Patent Number: 5,127,352
[45] Date of Patent: Jul. 7, 1992

[54] FLASHER DISPLAY SONAR DEPTH SOUNDER NON-INTRUSION SENSOR

[76] Inventor: Daniel S. Kulpa, 5528 Countess Dr., Fort Wayne, Ind. 46815

[21] Appl. No.: 583,017

[22] Filed: Sep. 10, 1990

[51] Int. Cl.$^5$ ............................................. B63H 25/00
[52] U.S. Cl. ................................. 114/144 E; 367/111
[58] Field of Search ................ 440/1, 2, 113; 367/107, 367/108, 99, 118, 173; 181/124; 342/118; 114/144 E, 144 B

[56] References Cited

U.S. PATENT DOCUMENTS

| | | | |
|---|---|---|---|
| 3,844,242 | 10/1974 | Sernatinger et al. | 114/144 B |
| 4,829,493 | 5/1989 | Bailey | 367/111 |
| 4,988,996 | 1/1991 | Ito | 367/111 |

Primary Examiner—Jesus D. Sotelo
Attorney, Agent, or Firm—Roger M. Rickert

[57] ABSTRACT

A small motor powered boat guidance system is disclosed and includes an arrangement for sensing the vertical distance between the boat and the bottom of a body of water in which the boat is floating and for providing a visual indication of the sensed vertical distance. A first series of visible pulses and a second series of visible pulses of the same frequency as the first series of pulses are generated with the pulses of the first and second series being interleaved and with the phase difference therebetween being indicative of the vertical distance. The visual indicator also generates, simultaneous with the visual indications, electromagnetic radiation in a region of the electromagnetic spectrum remote from the visible portion of the spectrum. An antenna and associated circuitry is responsive to the electromagnetic radiation remote from the visible portion of the spectrum for determining the phase difference between the first and second series of pulses, and therefor also an indication of the distance between the boat and the bottom of the body of water. This distance indication is compared to an operator entered selected distance and an output indication is provided when the distance indication and the selected distance differ by more than a predetermined value. Upon an indication that the distance indication and the selected distance differ by more than a predetermined value, the direction of motor thrust relative to the boat is modified appropriately.

8 Claims, 2 Drawing Sheets

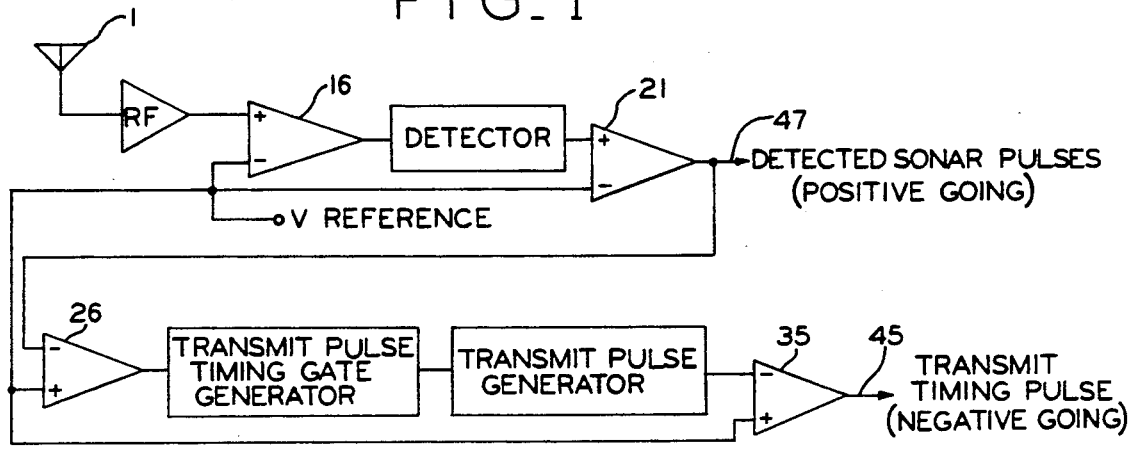
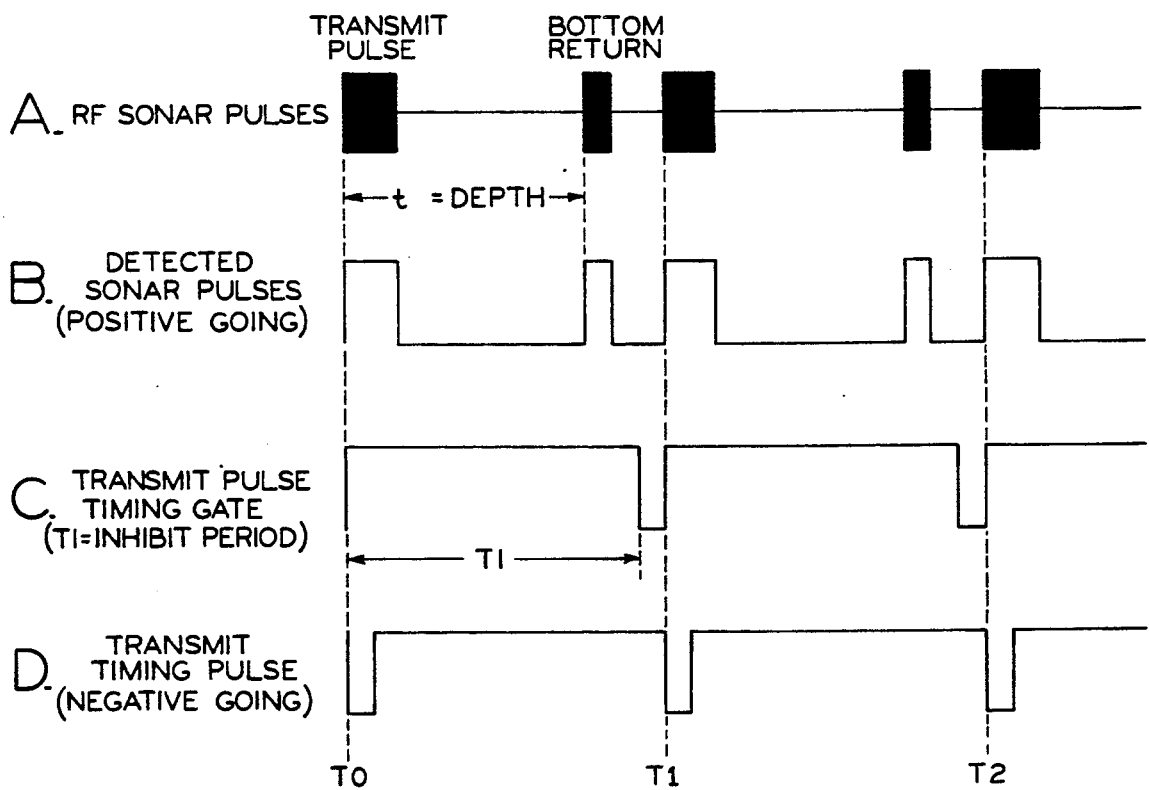

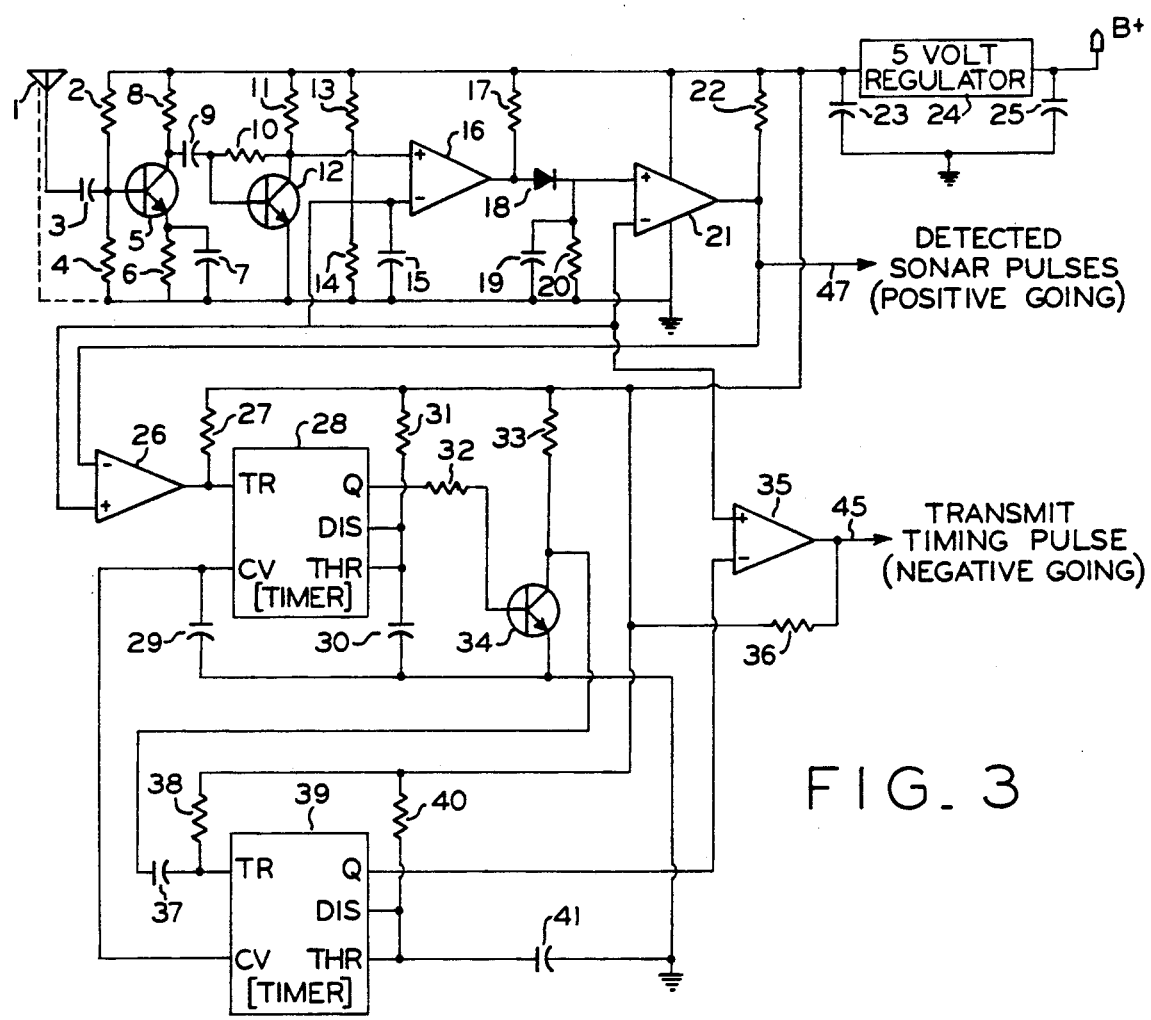
FIG_3
DETECTED SONAR PULSES (POSITIVE GOING)
TRANSMIT TIMING PULSE (NEGATIVE GOING)
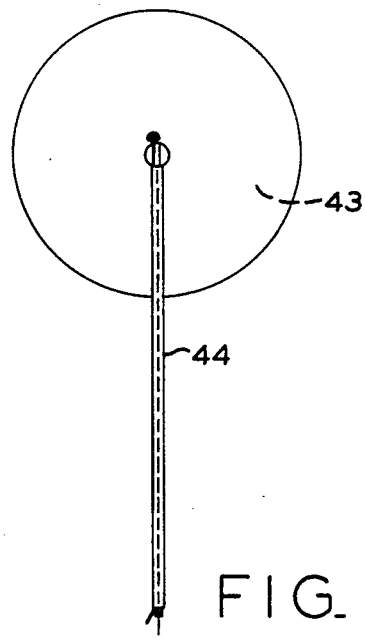
FIG_4a
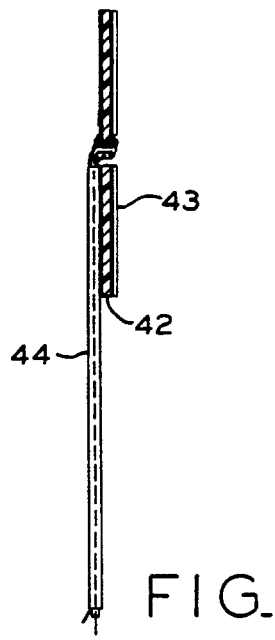
FIG_4b

FLASHER DISPLAY SONAR DEPTH SOUNDER NON-INTRUSION SENSOR

SUMMARY OF THE INVENTION

The present invention relates generally to the control of small craft such as fishing boats and the like and more particularly to a control arrangement which powers the craft while maintaining the depth or vertical distance from the craft to the bottom of a body of water substantially constant. In particular, the present invention provides a non-intrusive coupling to commercially available depth finding equipment for providing input depth information to the circuitry controlling the craft.

In my copending application Ser. No. 07/313,080 filed Feb. 21, 1989, there is disclosed a method of and apparatus for guiding a small motor powered boat which includes the sensing of the vertical distance between the boat and the bottom of a body of water in which the boat is floating followed by a comparison of the sensed distance to an operator selected distance. The direction of motor thrust relative to the boat is changed when the comparison indicates the sensed distance and the selected distance differ by more than a user determined value. The direction of motor thrust is changed in a direction determined at least in part by previous knowledge of the position of the boat relative to the bottom of the body of water such as user entered information on the direction and sense in which water depth changes, e.g., an indication of whether movement to the left or to the right will result in a decreasing depth. The direction of motor thrust is changed by an operator predetermined fixed angle and the direction of motor thrust is returned to a neutral position when the comparison indicates the sensed distance and the selected distance differ by less than the predetermined value. The entire disclosure of this copending application is specifically incorporated herein by reference.

A common display used by commercial sonar depth sounders is a rotating neon lamp that flashes when the sonar pulse is transmitted and then again when sonar reflections are received. The usual implementation is for the neon bulb to be rotated at a constant angular velocity so that one revolution (360 degrees) is equivalent to the maximum design depth. Since the angular velocity is constant, depth is displayed linearly with angular displacement. The neon bulb rotates behind a plastic panel which has a clear circular window, numerically calibrated in depth units. When the neon bulb flashes, depth is indicated by a coincident depth number. When the neon bulb flashes, a pulse of broadband radio frequency (RF) energy is released. The duration of the pulse is equivalent to the period of illumination of the neon bulb. The stronger the sonar return the longer the period of illumination. A primary object of this invention is to pick up these low level RF signals with a sensor placed in close proximity with the display panel. These signals are then processed to provide the sonar transmit and bottom pulse as required by the sonar interface electronics.

Among the several objects of the present invention may be noted the provision of a non-intrusive coupling between a sonar display and a small boat guidance system; the provision of a broadband RF coupling to an optical display device; the provision of a method of detecting energization of a strobed visual indicator; and overall improvement in the method of and apparatus for guiding a small motor powered boat.

The RF energy generated by the display panel probably results from a combination of radiation from the wires running to and from the rotating neon bulb and energy radiated from the arching of the brushes which couple the energy to the rotating neon bulb.

Another object of the invention is to discriminate between the low level RF pulses and background RF such as local radio stations. This object is achieved with the RF sensor (antenna or probe) which is located in close proximity to the visible display and nearly totally shields all signals except those radiated by the flasher display. The sensor is simply affixed with adhesive, such as a double-sided tape, to the sonar display panel. No electrical connections are required for interface to the off-the-shelf commercial sonar depth sounder, yet full advantage of all processing capabilities of the depth sounder, such as sensitivity and noise rejection, can be taken. The invention will work with any flasher type depth sonar.

The electromagnetic radiation from the neon bulb has a wavelength on the order of $10^{-6}$ meters while the RF radiation associated therewith has a wavelength on the order of one meter. The radiation in one of these simultaneously generated yet widely separated regions of the electromagnetic spectrum may be utilized to detect the other.

Accordingly, a further object of the present invention is to provide an electromagnetic radiation sensor which is responsive to electromagnetic radiation generated contemporaneously with enablement of a visual display, but in a region of the electromagnetic spectrum remote from the visible portion of the spectrum. Successively sensed enablements of the visual display may be utilized as inputs to a small motor powered boat guidance system.

These as well as other objects and advantageous features of the present invention will be in part apparent and in part pointed out hereinafter.

In general, a method of guiding a small motor powered boat includes sensing the vertical distance between the boat and the bottom of a body of water in which the boat is floating. This step may be facilitated using a commercially available sonar depth sounding device and includes transmitting a sound wave downwardly through the water and generating a first radio frequency signal substantially contemporaneously therewith, sensing a returned reflection of the generated sound wave from the bottom and generating a second radio frequency signal substantially contemporaneously therewith, and converting the time between the first and second radio frequency signals into an indication of water depth. The sensed distance is then compared to an operator selected distance and the direction of motor thrust relative to the boat is changed when the step of comparing indicates the sensed distance and the selected distance differ by more than a predetermined value.

Also in general and in one form of the invention, a method of and apparatus for detecting energization of a strobed visual indicator comprises placing a radio frequency antenna in close proximity to the visual indicator, shielding the radio frequency antenna from spurious radio frequency signals, and sensing for any broad band radio frequency emissions associated with energization of the visual indicator. The method of detecting energizaition is, in one preferred form, for coupling the visual display of a depth finding device to a small motor powered boat guidance system. The electromagnetic radiation sensor (antenna and associated circuitry) is responsive to electromagnetic radiation generated contemporaneously with enablement of the visual display, but in a region of the electromagnetic spectrum remote from the visible portion of the spectrum. Successively sensed visual display enablements are supplied to a control circuit as in my aforementioned copending application for further processing and craft control.

BRIEF DESCRIPTION OF THE DRAWING

FIG. 1 is a block diagram of a non-intrusive sensor system illustrating my invention in one form;

FIG. 2 is a timing diagram illustrating waveforms at various points in FIG. 1;

FIG. 3 is a more detailed schematic diagram of the circuitry for implementing the system of FIG. 1; and FIGS. 4a and 4b are front and side views respectively of a RF probe for attachment to the face of a sonar display.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

A block diagram of the flasher sensor electronics with outputs suitable for coupling to small craft control circuitry such as shown in my abovementioned copending application is shown in FIG. 1 and the associated timing diagram is shown in FIG. 2. The RF bursts generated by the depth sonar when it initially transmits the sonar signal and then again when a reflection(s) is received, are picked up by the antenna. This antenna is designed to reject all RF signals except those generated by the depth sonar, but such rejection is not on the basis of signal frequency. The ability of the antenna to only receive those signals generated by the depth sounder and to reject all others eliminates the need for any tuned elements within this circuit. There are no circuit elements which require adjustment for circuit operation. The RF circuits operate broadband. This greatly simplifies the design. The RF signals are amplified by a broadband RF amplifier and then level shifted using a comparator to produce signals which go from ground to 5 volts. This arrangement also provides signal to noise improvement since signals at the input of the comparator must be greater than the reference voltage. This arrangement also accommodates a large range of input signal levels eliminating the need for automatic gain control (AGC) to prevent circuit overload. The output of the comparator is envelop detected and applied to the input of a second comparator producing positive going DC pulses which are equivalent in time and duration to the transmit and received pulses displayed on the depth sounder. It is necessary to produce a DC pulse which is coincident with the transmit pulse only (waveform D in FIG. 2). This is accomplished using a timing gate which is triggered by the initial transmit pulse, having a period (Ti in FIG. 2) nearly equal to the transmit period of the depth sonar. This timing gate accomplishes two functions, first it triggers a short duration timer that generates a time coincident transmit pulse and second, since its period is equivalent to the sonar transmit period, rejects triggering by all received sonar signals synchronizing the short duration timer to the sonar transmit period. Since the sonar transmit pulse must be negative going, the output of the transmit pulse generator is inverted with a comparator.

A circuit diagram of the Flasher Display Sonar Depth Sounder Non-Intrusion electronics is shown in FIG. 3. A detailed description of this circuit follows. The RF pulses shown as waveform A in FIG. 2 are radiated from the depth sonar and received by antenna 1. A description of this antenna or RF probe is shown in FIGS. 4a and 4b. It is made from 1/16 inch thick, double-sided printed circuit board dielectric material 42 sandwiched between conductive (e.g., copper) layers which is cut in a circle 1.875 inch in diameter. The conductive surface or side 43 to be placed adjacent to the flasher display panel is the RF receive side of the pc board and the opposite side is tied to ground to produce a shield to extraneous RF signals such as local radio stations. This shield is maintained by use of a shielded cable 44 to couple the received RF signals to the input of the electronics. The shield connects to the copper surface remote from the display while the center conductor of the cable 44 connects to the copper surface 43. An adhesive (1/32" double sided tape) is placed on the receive side 43 of the antenna so that it can be easily attached to the front panel of the depth sonar. Thus, the printed circuit board has two copper surfaces, one 43 which faces the display and acts as the antenna and the other which acts as a shield against spurious RF signals. The RF signals from antenna 1 are coupled through capacitor 3 to the RF amplifier made up of resistors 2, 4, 8 and 6, transistor 5, and capacitor 7. This amplifier is designed to provide a nominal gain of 20 dB. The output of this amplifier is coupled through capacitor 9 to the RF amplifier made up of resistors 10 and 11, and transistor 12. Transistor 12 is biased with its collector at only 0.75 volts and, due to the negative feedback provided by resistor 10, a gain of only 10 dB. This bias point was selected so that RF signals at the base of transistor 12 would be clipped-off when their level exceeds the forward base emitter diode drop of transistor 12. At the collector output of transistor 12, signals move above and below the collector bias point of 0.75 volts. In effect, this stage level shifts the RF signal to provide linear gain between 0.75 volts and +5 volts. The collector of transistor 12 is direct coupled to the non-inverting input of comparator 16. Resistors 13 and 14 form a voltage divider to provide a reference voltage of 1.5 volts at the inverting input of comparator 16. Capacitor 15 is placed across resistor 14 to remove noise from the reference voltage line. Resistor 17 is required to properly load the open collector of the output of comparator 16. The function of this comparator is to provide an output which goes from ground to 5 volts for RF signals which exceed the reference level of 1.5 volts. This implementation provides noise rejection to signals below the reference of 1.5 volts and accommodates for large dynamic ranges in that for any signal level which exceeds 1.5 volts at the non-inverting input of comparator 16 will appear at the 5 volt level at the comparator output. This result is achieved for signals which completely cutoff transistor 12 which drive its collector to 5 volts. The output of comparator 16 is envelop detected with diode 18 capacitor 19 and resistor 20. This DC envelop is direct coupled to the non-inverting input of comparator 21. Resistor 22 is required to properly load the open collector of the output of comparator 21. The output of comparator 21 on line 47 is 5 volt (positive going) pulses equivalent in time and duration to the RF pulses produced by the depth sonar and is illustrated as waveform B in FIG. 2. The output of comparator 21 is direct coupled to the inverting input of comparator 26. Resistor 27 is required to properly load the open collector of the output of comparator 26. The output of comparator 26 is the inverted output of comparator 21. Timer 28 is half of an LM556 integrated circuit dual timer package. A negative going pulse at its trigger input (TR) starts the timer. Resistor 31 and capacitor 30 set the period of the timer. Capacitor 29 is required at the control voltage (CV) input when this input is not used. Since the sonar transmit period is 24 milliseconds (60 feet=maximum operating depth [(60 ft*2)/5000 ft/sec=24 ms] this time has been set for 22 milliseconds. This theoretically will limit system depth operation to 55 feet. The timer functions as a timing gate triggered by an initial received pulse and having a reset period (Ti on waveform C in FIG. 2) nearly equal to the period of the transmitted series of sonar pulses to extricate a series of pulses which coincides substantially to the transmitted sonar depth series of pulses. The output of timer 28 is normally low, going high when triggered. This output is inverted with resistors 32 and 33, and transistor 34, differentiated by resistor 38 and capacitor 37 to trigger timer 39 coincident with the triggering of timer 28. Timer 39 is the other half of the LM556 integrated circuit containing timer 28. Its CV input is also tied to capacitor 29. Resistor 40 and capacitor 41 set the period of timer 39 to 1 millisecond. Since the synchronized transmit pulse must be negative going, the output (Q) of timer 39 is direct coupled to the inverting input of comparator 35. Resistor 36 is required to properly load the open collector of the output of comparator 35. The output of comparator 35 on line 45 is a normally 5 volts going to ground for 1 millisecond in synchronous with the sonar transmit pulse and is shown as waveform D in FIG. 2.

Lines 45 and 47 form the input to the circuit depicted in FIG. 2 of my abovementioned copending application. It will be noted that the sonar transmit and return signals which form the input to the circuit of FIG. 2 in my copending application varied in that previous case between 0 and 7 volts while here the variation is between 0 and 5 volts. Complete compatibility is achieved by modifying the values of the resistors 48 and 49 in FIG. 2 of that prior case.

The circuit is powered from a conventional integrated circuit voltage regulator 24. Capacitors 23 and 25 provide the recommended input and output filtering.

From the foregoing, it is now apparent that a novel arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. The method of detecting energization of a strobed visual indicator comprising the steps of placing a radio frequency antenna in close proximity to the visual indicator, shielding the radio frequency antenna from spurious radio frequency signals, and sensing for any broad band radio frequency emissions associated with energization of the visual indicator.

2. A small motor powered boat guidance system comprising:
    means for sensing the vertical distance between the boat and the bottom of a body of water in which the boat is floating;
    means for providing a visual indication of the sensed vertical distance including means providing a first series of visible pulses, means for providing a second series of visible pulses of the same frequency as the first series of pulses, the pulses of the first and second series being interleaved with the phase difference therebetween being indicative of the vertical distance; the means for providing a visual indication also generating, simultaneous with the visual indications, electromagnetic radiation in a region of the electromagnetic spectrum remote from the visible portion of the spectrum;
    means responsive to the electromagnetic radiation remote from the visible portion of the spectrum for determining the phase difference between the first and second series of pulses, and therefor also an indication of the distance between the boat and the bottom of the body of water;
    means for comparing the distance indication from the responsive means to an operator entered selected distance and for providing an output indication when the distance indication and the selected distance differ by more than a predetermined value; and
    means for changing the direction of motor thrust relative to the boat when the means for comparing indicates the distance indication and the selected distance differ by more than a predetermined value.

3. The small motor powered boat guidance system as set forth in claim 2 wherein the means responsive to the electromagnetic radiation includes a directional radio frequency probe in close proximity to the means for providing a visual indication.

4. The small motor powered boat guidance system as set forth in claim 3 wherein the radio frequency probe comprises a relatively flat sheet of dielectric material sandwiched between opposed conductive layers, one conductive layer comprising an antenna and the other conductive layer comprising a grounded radio frequency shield.

5. The small motor powered boat guidance system as set forth in claim 4 further comprising a broad band radio frequency amplifier for receiving and amplifying signals from the antenna, a comparator coupled to the radio frequency amplifier, a detector coupled to the comparator for envelop detecting the comparator output, a second comparator receiving the detector envelop detected output and providing direct current pulses equivalent in time and duration to the first and second series' of visible pulses.

6. The small motor powered boat guidance system as set forth in claim 5 further comprising means for extricating the first series of pulses from the interleaved first and second series.

7. The small motor powered boat guidance system as set forth in claim 6 wherein the means for extricating comprises a timing gate triggered by an initial received pulse and having a reset period nearly equal to the period of the first series of pulses to thereby provide a series of pulses which coincides substantially to the first series of pulses.

8. The small motor powered boat guidance system as set forth in claim 2 wherein the means for providing a visual indication comprises the visual display of a depth finding device having a neon bulb rotated at a substantially constant angular velocity and energized twice during each revolution, once for each series of visible pulses.

* * * * *